United States Patent
Lühmann et al.

(10) Patent No.: US 6,811,869 B2
(45) Date of Patent: Nov. 2, 2004

(54) SELF-ADHESIVE SHEET FOR PROTECTING VEHICLE FINISHES

(75) Inventors: Bernd Lühmann, Norderstedt (DE); Nicolai Böhm, Hamburg (DE); Ingolf Schütz, Hamburg (DE); Herbert Sinnen, Pinneberg (DE); Ingo Neubert, Norderstedt (DE); Bernhard Müssig, Seevetal (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/076,827

(22) Filed: Feb. 15, 2002

(65) Prior Publication Data

US 2003/0054163 A1 Mar. 20, 2003

(30) Foreign Application Priority Data

Apr. 2, 2001 (DE) .......................................... 101 16 438

(51) Int. Cl.$^7$ .................................................. C09J 7/02
(52) U.S. Cl. ................................ 428/355 EN; 428/343; 428/353; 428/515; 428/516; 428/517
(58) Field of Search .......................... 428/355 EN, 343, 428/355 BL, 515, 516, 517, 353; 156/334

(56) References Cited

U.S. PATENT DOCUMENTS

| | | | | | |
|---|---|---|---|---|---|
| 4,379,806 | A | * | 4/1983 | Korpman | 428/354 |
| 5,601,917 | A | * | 2/1997 | Matsui et al. | 428/356 |
| 5,643,676 | A | * | 7/1997 | Dobashi et al. | 428/411.1 |
| 5,895,714 | A | | 4/1999 | Malek | 428/337 |
| 5,925,456 | A | | 7/1999 | Malek | 428/332 |
| 6,319,353 | B1 | * | 11/2001 | Mussig | 156/334 |
| 2001/0004474 | A1 | * | 6/2001 | Mussig | 428/343 |

FOREIGN PATENT DOCUMENTS

| | | | | |
|---|---|---|---|---|
| DE | 195 32 220 A1 | 3/1997 | .............. | C09J/7/02 |
| DE | 196 35 704 A1 | 3/1998 | .............. | C09J/7/02 |
| DE | 197 30 193 A1 | 1/1999 | .............. | C09J/7/00 |
| DE | 197 42 805 A1 | 4/1999 | .............. | C09J/7/00 |
| DE | 199 23 780 A1 | 11/2000 | .............. | C09J/7/00 |
| EP | 0519278 A2 | * 12/1992 | | |
| EP | 0 661 364 A2 | 7/1995 | .............. | C09J/7/02 |
| EP | 0905209 A1 | * 3/1997 | | |
| EP | 0 888 882 A1 | 1/1999 | .......... | B32B/27/00 |
| JP | 8-27444 | 1/1996 | .............. | C09J/7/02 |
| WO | WO 96/37568 | * 11/1996 | | |

OTHER PUBLICATIONS

U.S. patent application Ser. No. 09/980,592; filed Mar. 6, 2002; Bohm et al.
U.S. patent application Ser. No. 09/156,886; filed Sep. 18, 1998; Müssig.

* cited by examiner

Primary Examiner—Daniel Zirker
(74) Attorney, Agent, or Firm—Norris McLaughlin & Marcus

(57) ABSTRACT

A self-adhesive protective sheet for painted surfaces of vehicles, especially automobiles, wherein
  the backing of the protective sheet is a film coated on one side with an adhesive and whose adhesion to steel is between 0.1 and 2.0 N/cm, and
  following storage under alternating climatic conditions, the protective sheet can be removed without residue from painted surfaces at speeds of 20 m/min with a bond strength of from 2.3 to 3.6 N/cm, and
  the protective sheet can be detached without residue following storage under alternating climatic conditions at a temperature of up to at least 50° C.,
    said adhesive comprising at least one polymer of at least two different α-olefins,
    no monomer having a fraction of 75 mol % or more in the polymer,
    the polymer having a Mooney viscosity ML (1+4) 125° C. of at least 50, and
    the polymer likewise possibly including a diene as further comonomer.

15 Claims, No Drawings

SELF-ADHESIVE SHEET FOR PROTECTING VEHICLE FINISHES

The invention relates to a self-adhesive sheet for temporarily protecting fresh paint surfaces of vehicles such as automobiles and freshly painted vehicle parts against soiling and damage during assembly, transit, and storage, and to its use on vehicles, especially on automobiles.

The preservation and protection of motor vehicles in transit from manufacturer to dealer has long been common practice. A known method of preserving automobiles is to apply paraffin waxes in a thickness of from 5 to 20 $\mu$m. It has been found, however, that, especially on horizontal areas of the vehicles, such a thin and usually nonuniform coat does not afford adequate protection against external influences, such as the corrosive effect of bird droppings, for example. A considerable disadvantage of sealing with paraffin wax is, furthermore, the need to remove the preservative using a steam jet, surfactants or solvents. Environmentally sound recovery and disposal of the residues entail considerable deployment of apparatus and also very high costs.

A current development in the field of automobile transit protection is the use of covers which go over the entire vehicle and are shrunk on to fit by exposure to heat. Cover solutions of this kind are very costly and involve a great deal of effort in applying the cover, effecting shrinkage, and especially for entry to the masked vehicle. For that particular purpose, zipper openings are provided, whose necessary opening and reclosing is time-consuming. Visibility when maneuvering the vehicle is severely impaired, moreover, and the enclosed dirt and unavoidable scuffing result in instances of dulling on the finish in certain areas. The widespread establishment of this solution has not so far been possible.

Self-adhesive surface protection sheets for motor vehicles have likewise been known for some time. In the majority of cases, they comprise permanently adhesive and decorative sheets, such as an anti-stonechip sheet, for example. These self-adhesive sheets remain permanently on the vehicle following their application.

In recent years, increased use has been made of temporary self-adhesive surface protection sheets. These reversibly adhesive protective sheets are specially intended for mechanical and chemical protection of freshly painted motor vehicles and vehicle parts during transit and storage, have a much better protective effect than the waxes, and have the advantage over the covers of being more favorably priced and much quicker to apply. One essential requirement made of a temporary surface protection sheet is its weathering stability and light stability over a period of several months. Accordingly, even after six months of intense sunlight exposure and fluctuating climatic conditions, a sheet of this kind must be able to be removed without residue.

The quality of absence of residues must likewise be ensured for the removal of the protective sheet at elevated temperatures of at least 50° C., since it can be assumed that, especially in the summer months and in southerly regions, the surfaces of the vehicle will become hot, and it cannot be assumed that the person removing the surface protection sheets will wait for the vehicles to cool down.

The final bond strength on the finish, referred to by the skilled worker as peel increase, must not be too high, since otherwise a large amount of force or even tearing of the sheet will accompany the unmasking of the paint surfaces. Moreover, the surface protection sheet is required to possess a sufficiently high initial tack, in order to ensure sufficiently reliable bonding even in difficult surface geometries.

Reversibly adhering surface protection sheets available to date have had considerable deficiencies in respect of bonding reliability, peel increase or aging stability.

Essential qualities of a surface protection sheet are:

effective protection for the paint against chemical and mechanical influences.

Weathering stability over the entire duration of the transit chain from plant to dealer, which depending on distance may amount to several months. Even after long and intense sunlight exposure, therefore, such a sheet must be able to be removed in one piece and must not leave residues of adhesive on the paint.

Adequate initial tack, in order to prevent premature self-induced detachment in difficult bonding geometries.

Balanced final bond strength, in order that the sheet, firstly, adheres securely (even in a strong slipstream or heavy rain) but on the other hand can be removed without great force or even tearing. Ideally, the desired bond strength should be present right from the start. In practice, however, the adhesion is weaker to start with and then increases over time and particularly under the influence of temperature. This is referred to in the art as "peel increase".

Paint compatibility, which means that the paint surface should not exhibit any adverse effects whatsoever, in the form of deposits or deformation, after the adhesive tape has been removed. Deformations are impressions in the paint which show up, firstly, as contours of the film edge, included air bubbles and folds, and secondly as areas of dulling over the entire area where the sheet was stuck.

In accordance with the prior art, the film materials used for temporary surface protection generally comprise polyolefins or mixtures thereof, blended customarily with light stabilizers and titanium dioxide (DE 199 23 780 A1, DE 196 35 704 A1).

Self-adhesive compositions used include polar and nonpolar polymers. In principle, all known polar self-adhesive compositions, such as those based, for example, on EVA and polyacrylate, exhibit considerable paint incompatibility in testing, i.e., following application to painted metal panels and subsequent storage under alternating climatic conditions. Incompatibility with the paint results in high bond strength, referred to as peel increase by the skilled worker, and also in paint deformation following weather storage.

The adhesive sheet described in DE 195 32 220 A1, with polar polyethylene-vinyl acetate (EVAc) adhesive compositions, is superior in adhesion properties to the systems described above.

This system achieves good bond values after just a short time, and ensures a high level of bonding reliability toward unwanted self-induced detachment during transit. On the other hand, following application, owing to the use of the polar polyethylene-vinyl acetate adhesive, severe peel increase of the surface protection sheet, and also considerable deformations of the paint surface, are observed.

Deformations are visually perceptible, irreversible changes to the paint surface which come about if the fresh paint, not yet fully cured, is covered with an unsuitable protective film. The skilled worker will therefore avoid polar adhesive systems for temporary surface protection.

The majority of known nonpolar, noncrosslinked self-adhesive compositions, on the other hand, exhibit low cohesion, which leads to residues of adhesive when the protective film is removed following use.

WO 96/37568 A1 describes the use of polyhexene and/or polyoctene for a nonpolar pressure sensitive adhesive.

Although the peel increase of the polymers described in the examples is low from paint surfaces, the low molecular weight of commercial polymers of this kind nevertheless means that these polymers, too, lead to considerable residues on the paint surface following use. Even by adding what are referred to as "cold flow restricting agents", it is impossible to avoid these residues. Where, however, these adhesive compositions are crosslinked chemically or by radiation before use for the purpose of increasing the cohesion, unwanted deformation of the paint surface is observed.

An exception is formed only by self-adhesive compositions based on natural rubber, which can be removed residuelessly with little paint deformation. These compositions, however, are not stable to aging under UV radiation. A consequence of this are severe residues, which are greasy or have undergone paintlike hardening, on the painted metal following extreme climatic exposure for a prolonged period (from three to six months), such as occurs, for example in Florida.

The only suitable nonpolar adhesive base for surface protection affording sufficiently high cohesion comprises polymers from the classes of the polyisobutylenes and butyl rubbers, hydrogenated styrene block copolymers, and ethylene-propylene copolymers and terpolymers.

EP 0 519 278 A1 describes a sheet for protecting automobiles, comprising a backing coated with a pressure sensitive adhesive based on rubber, especially polyisobutylene, which has a dynamic elasticity modulus of from $2 \times 10^5$ to $7 \times 10^6$ $dyn/cm^2$, corresponding in SI units to a value of from $2 \times 10^4$ to $70 \times 10^4$ Pa, at 60° C.

Performance tests with a self-adhesive sheet of this kind evidence good compatibility with paint surfaces. The bond strength following storage under alternating climatic conditions on paints customary in the automobile industry, however, is so low that the bond strength required in the art is not always adequately present. Especially when the sheet is subject to the influence of moisture, the bond strength is frequently reduced to such an extent that the sheet detaches during transit from the vehicles it is protecting, so that, firstly, there is no longer any protective effect and, secondly, the detached film constitutes a considerable safety risk for following vehicles, for example.

Moreover, the self-adhesive composition lacks compatibility with the rubber seals (sealing profiles) that are customary in automobile construction; when the protective sheet is removed from window profiles, residues of the adhesive coating remain on the rubber. Removal of the protective sheet leaves edges with residues of adhesive, which can be attributed to breakdown of the polymer under UV exposure.

A further disadvantage is the aging behavior of the polyisobutylenes. Polyisobutylenes are known to be soft (with little cohesion), especially following aging by heat or UV radiation. This leads to residues on the paint after unmasking. For this reason, the polyisobutylene-based adhesive sheet that is present on the market is highly pigmented; the destructive effect of light is ideally to be kept away from the adhesive composition. In the edge region, however, the adhesive is exposed directly to UV light, leading to severe residues there. Attempts to avoid this are made by adding antioxidants and HALS light stabilizers to the polyisobutylenes; these additives are described in U.S. Pat. No. 5,601,917 A1.

Adhesives based on hydrogenated styrene-diene block copolymers, whose use in surface protection is described in JP 08 027 444 A1, EP 0 888 882 A1, and U.S. Pat. No. 4,379,806 A1, are somewhat more UV-stable than those based on polyisobutylene. An important disadvantage of such block copolymers, however, is their reversible thermal crosslinking by way of the styrene domains. If an adhesive sheet produced from them is removed in summer from a vehicle which has become hot in the sun, there is a risk that the adhesive will remain adhering to the paint, since the cohesion of the adhesives in the hot state is lower than their adhesion to the paint, owing to the melting of the styrene domains. Furthermore, heating always leads to shrinkage of the protective sheet, and the warmed, soft adhesive therefore leaves residues on the receding edges of the adhesive sheet on the panel. Performance tests have likewise shown that masking sheets having styrene block copolymer adhesives cause considerable deformations of the vehicle finish.

The adhesive described in DE 197 42 805 A1 is based on a copolymer composed of at least two different olefins having from 2 to 12 carbon atoms, and a diene. Preference is given to using ethylene-propylene-diene (EPDM) terpolymers. Nonpolar ethylene-propylene-diene polymers feature good weathering stability and UV stability, so making them outstandingly suitable for use as adhesives for surface protection sheets. The terpolymers the patent describes possess a Mooney viscosity ML (1+4) 125° C. of less than 50.

Investigations on different EPDM specimens have shown that the adhesiveness of EPDM polymers decreases as their Mooney viscosity rises; accordingly, only grades having a Mooney viscosity ML (1+4) 125° C. of less than 30 possess sufficient inherent tack. The cohesion of these EPDM grades, however, is too low for their use as temporary self-adhesive compositions (in analogy to WO 96/37568 A1); residues of adhesive on the paint surface after weathering are the consequence.

Example 1 in DE 197 42 805 A1 describes a self-adhesive protective sheet comprising an adhesive composed of an EPDM having a Mooney viscosity ML (1+4) 125° C. of 28, and a light stabilizer. With this protective sheet, a sufficient, high bond strength of 0.4 N/cm is obtained on a PU paint surface.

A considerable disadvantage, however, is that, owing to the low molar weight of the polymer, it is impossible to remove this protective sheet from the paint surface without residue following storage at elevated temperature (90° C.). Even at slightly increased removal temperatures of 40° C., this adhesive fails completely and is transferred to the paint surface over the entire area. On removal at a realistic speed of 20 m/min, a severe increase in peel strength (4.3 N/cm) and residues of adhesive on the paint surface over the entire area are observed. When the protective sheet is removed from test paint surfaces at a lower speed of 0.3 m/min (corresponding to AFERA 4001 or DIN EN 1939), following storage under alternating climatic conditions, on the other hand, only local residues of adhesive are observed, and bond strengths of 2.3 N/cm are measured. In practice, however, the vehicles are unmasked at higher removal speeds of at least 15 to 30 m/min so that the measurement of the bond strengths according to AFERA 4001 and DIN EN 1939 is not relevant in practice. These measurement methods cannot be used to assess the suitability of a self-adhesive protective sheet.

In examples 2 and 4 of the description, attempts are made to counter the severe peel increase by crosslinking the adhesive using electron beams and UV radiation, respectively. In this case a bond strength on paint (removal speed 0.3 m/min) of 2.2 N/cm is obtained following storage under alternating climatic conditions. The corresponding value after storage under alternating climatic conditions and at a peel speed of 20 m/min is 3.4 N/cm. The crosslinking results in an increase in the cohesion of the adhesive, as a result of which it is possible to avoid residues of adhesive on the paint surface following removal therefrom. The greater cohesion of the adhesive is likewise reflected in the absence of residues when the protective sheet is removed from painted metal test panels at temperatures up to 60° C. On the other hand, however, crosslinking makes the adhesive relatively hard, leading to considerable deformations of the paint surface and to an inadequate initial bond strength of 0.2 N/cm.

Another example is an adhesive based on poly-α-olefins (DE 197 30 193 A1). With this surface protection sheet, a considerable discrepancy is again observed between the bond strengths at low and high removal speeds. In analogy to DE 197 42 805 A1, only polymers having a Mooney viscosity ML (1+4) 125° C. of less than 50 are used in these examples too. As a result, and again as a consequence of the low cohesion, severe peel increase and residues of adhesive are observed on the paint surface. The peel strengths are above 3.2 N/cm.

It is an object of the present invention to remedy this situation and, in particular, to provide a self-adhesive protective sheet which does not have the disadvantages of the prior art, or at least not to the same extent. This object is achieved by means of a self-adhesive protective film as set out in the main claim. The subclaims provide advantageous developments of the self-adhesive protective sheet, and also particular possibilities for its use.

Surprisingly, and unexpectedly even for the skilled worker, a protective sheet with a sheet which is coated on one side with a film of adhesive exhibits the properties required in particular for use on painted vehicles such as automobiles, the adhesive comprising at least one polymer of at least two different α-olefin monomers, preferably ethylene and propylene, with no one monomer in the polymer exceeding a fraction of 75 mol %, preferably a fraction of 60 mol %, and the adhesive possessing a Mooney viscosity ML (1+4) 125° C. of 50 or more.

The polymer may likewise include a diene such as, for example, 1,4-hexadiene, dicyclopentadiene or, in particular, 5-ethylidene-2-norbornene (ENB). Examples of these polymers are EP(D)M rubbers of the Vistalon® (Exxon Chemical), Nordel® (DuPont Dow Elastomers), Buna® (Bayer), Keltan® (DSM Elastomers), Royalene® (Uniroyal Chemicals), and Duteral® (EniChem) types, to name a few examples, without this list being conclusive.

Norbornene is the trivial name for bicyclo[2.2.1]hept-2-ene, whose steric structure looks like this:

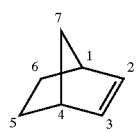

The steric structure of 5-ethylidene-2-norbornene (ENB), a diene derived from norbornene, looks like this:

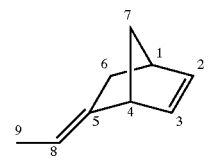

The Mooney viscosity ML (1+4) 125° C. of the polymer has a value of at least 50 or more, preferably 55 to 85 (ASTM D 1646).

This high value is necessary in order to ensure sufficient cohesiveness of the adhesive, so that following storage under alternating climatic conditions the protective sheet can be removed from painted surfaces without residue at speeds of 20 m/min with a bond strength of from 2.3 to 3.6 N/cm, and can also be detached without residue following storage under alternating climatic conditions at a temperature of up to at least 50° C.

The bond strength on steel is between 0.1 and 2 N/cm, in particular between 0.3 and 1 N/cm.

With preference, at least one polymer of the adhesive is ethylene, propylene or a diene, and, with further preference, the diene monomer fraction of the polymer of the adhesive is below 10% by weight.

In comparison to the EP(D)M materials, the polyisobutylenes used for surface protection (for example, Oppanol B 150® (BASF)) have a very much higher solution viscosity, so that their processing entails a very great deal of effort.

A further advantage of the EPDM polymers is provided by the broad possibilities for variation of the ratio of the ethylene and propylene comonomers. A large number of EPDM polymers are available commercially, so that the polymer appropriate to the requirement can be used. For the self-adhesive composition of the invention, EPDM grades having a propylene content of more than 25%, but preferably between 40 and 60%, are used. Ethylene-propylene copolymers having a propylene content of between 40 and 60% are approximately amorphous and are therefore of great suitability as base polymers for the self-adhesive composition of a surface protection sheet. Increasing deviation from this middle propylene content is accompanied, owing to the higher crystalline fraction in the polymer, by considerable paint deformation following application and also by a reduction in the bond strength.

In order to optimize the properties, particularly the adhesive characteristics and the deformation of specific paints, the self-adhesive composition employed is blended with one or more additives. Additives may be tackifiers (tackifier resins which optimize the pressure sensitive adhesive properties), plasticizers, organic or inorganic fillers, pigments, light stabilizers, including those in the form of UV-absorbing, sterically hindered amines (HALS), aging inhibitors in the form, for example, of lactones, primary and secondary antioxidants, or further elastomers. Optionally, crosslinking agents and cross-linking promoters may be added to the self-adhesive composition. An exhaustive selection of crosslinking agents and crosslinking promoters are described in Ullmanns Enzyklopädie der technischen Chemie (4th ed.), Weinheim, and "Manual for Rubber Industry", Bayer AG (1995).

Examples of possible elastomers for modifying the self-adhesive composition include polyisobutylene, butyl rubber, hydrogenated block copolymers of styrene and dienes, and acrylic copolymers. These elastomers are used in the range from 0 to 20% by weight, preferably 10% by weight of a polyisobutylene of medium molecular weight, an example being Oppanol® B 10 (BASF).

Examples of suitable tackifiers are hydrocarbon resins (for example, those of C5 or C9 monomers), natural resins, polyterpene resins based on α-pinene, β-pinene or δ-limonene, rosin and rosin derivatives, and others, as set out in Ullmanns Enzyklopädie der technischen Chemie, volume 12, pp. 525–555 (4th ed.), Weinheim. Primarily, use is made of hydrogenated or partly hydrogenated resins which are more stable to aging. In the adhesive of the adhesive masking tape of the invention it is preferred to use from 20 to 50% by weight, in particular from 30 to 45% by weight, of a rosin per 100 parts of base polymer.

Examples of suitable plasticizers for the self-adhesive composition include aliphatic, cycloaliphatic, and aromatic mineral oils, diesters or polyesters of phthalic, trimellitic or adipic acid, liquid rubbers (for example, nitrile rubbers or polyisoprene rubbers), liquid polymers (of isobutene or ethylene-propylene), acrylates, polyvinyl ethers, liquid resins and soft resins based on the raw materials for tackifier resins, wool wax and other waxes, or liquid silicones. Particularly suitable are aging-stable plasticizers without olefinic double bonds. It is preferred to use from 0 to 40% by weight, in particular from 10 to 30% by weight, of liquid polymers based on isobutene such as Hyvis® (BP Chemicals) or ethylene/propylene such as Trilene® (Uniroyal) per 100 parts of base polymer.

Backing materials used for the protective sheet of the invention include thermoplastic films, preferably polyolefin films. They may be made, for example, of polyethylene, polypropylene, and their mixtures or copolymers (for example, random copolymers). Suitable thicknesses for the backing films are from 20 to 80 μm (including the adhesion promoter layer where appropriate). The softness of the backing film plays a part in the deformability of the protective sheet during its application; the force at 10% elongation should not exceed 25 N/15 mm, preferably 16 N/15 mm, in either the longitudinal or transverse direction. Owing to the stability with respect to shrinkage under heat, and the effective deformability, copolymers of propylene are particularly suitable. In order to formulate weathering stability into the backing film, it is absolutely necessary to add light stabilizers. Suitable films are described in DE 199 23 780 A1 and DE 196 35 704 A1.

As the backing film it is preferred to chose a thermoplastic polyolefin film which is unoriented and includes at least one polypropylene block copolymer. The polypropylene block copolymer content makes up from 10 to 95% (w/w) of the protective sheet.

Films of this kind can be produced on film blowing lines or, preferably, casting lines (T-die technology), with the film not being monoaxially or biaxially oriented by drawing (stretching) with stretching rolls or stretching frames. The orientation is to be minimized when blowing such a film, by way of the take-off speed, blowing ratio, and temperature profile.

The polypropylene block copolymers used (also called impact resistant polypropylene) are described in the literature in Encycl. Polym. Sci. Technol. 13, 479 ff. (1988) and in Ullmann's Encyclopedia of Industrial Chemistry A21, 529 ff. (1992). Examples of trade names are Propathene GSF 113 (ICI), 411 GA 05 (Amoco), PMA 6100 (Montell), Stamylan P (DSM), BD 801 F (Borealis), Daplen FFC1012 (PC), and Novolen 2309 L. Block copolymers of this kind differ substantially from one another in terms of their melt index (=MFI=MFR) and their comonomer content. The melt index influences the strength of the film and the fluidity of the melt in opposite ways. Advantageous for the preparation of the protective sheet of the invention is a melt index of from 0.8 to 15 g/10 min (ISO 1133 (A/4) at 230° C. and 2.16 kg), in order to achieve the requirements for toughness and tensile strength on the one hand and for processability (production speed and uniformity of thickness in the case of coextruded films) on the other. The preferred range is situated between 4 and 10 g/10 min. With this product, coextrusion is a suitable means of introducing the adhesion promoter layer during the preparation of the sheet.

Where backing film and adhesive are joined to one another by coextrusion, great importance attaches to the selection of the melt index of the polypropylene block copolymer and of the other thermoplastic constituents of the film formulation. The amount of comonomer in the polypropylene block copolymers determines the softness, tensile impact strength, and heat stability of the protective sheet produced from them. The protective sheet of the invention preferably includes a polypropylene block copolymer containing from 3 to 15% (w/w) of ethylene as comonomer. The tensile impact strength according to DIN 53448 should amount to at least 1000 mJ/mm$^2$ both longitudinally and transversely.

Further constituents used may include, for example, polyethylene (such as HDPE, LDPE, MDPE, LLDPE, VLLDPE, for example), copolymers of ethylene or propylene with polar comonomers, polypropylene homopolymers or polypropylene random copolymers for fine-tuning the properties (mechanical, thermal or other properties such as gloss, adhesion of the adhesive, extrusion characteristics, etc.). Particularly advantageous is the combination of two or more polypropylenes, differing in particular in softness and melt index, such as, for example, soft block copolymer with PP homopolymer or a hard block copolymer grade, since toughness, heat stability, and rheology can be adapted more effectively to the requirements than when using just a block copolymer. For sufficient heat stability, the fraction of propylene in a sheet layer should be at least 65% (w/w). When the sheet layer is of multi-ply construction, it is this layer which is responsible for the strength and which therefore includes the highest polypropylene fraction (and generally also has the highest thickness), and not any adhesion promoter layer.

With further preference, the sheet may be composed of a mixture of from 40 to 70 parts by weight of polyethylene,
from 20 to 40 parts by weight of polypropylene,
from 8 to 15 parts by weight of titanium dioxide, and
from 0.3 to 0.7 part by weight of light stabilizers.

Of the 40 to 70 parts by weight of polyethylene in the sheet, it is preferred for 30 to 50 parts by weight to comprise high-impact polyethylene.

The use of the titanium dioxide batch produces increased UV reflection and also reduced heating of the protective sheet under intense sunlight. Sterically hindered amines are used in particular as light stabilizers.

The UV transmittance of the protective sheet in the region from 290 to 360 nm is preferably below 1%, more preferably below 0.1%.

To improve the adhesion between film and self-adhesive composition it is advantageous to use an adhesion promoter layer, although not absolutely necessary; in such a case, the backing film is composed of the base layer and the adhesion promoter layer. The latter is preferably composed of a polyolefin, a blend of two or more polyolefins and/or components of the base layer and/or components of the adhesive.

Through the use of an adhesion promoter layer it is possible to ensure that, even at elevated paint temperatures of 60° C., such as are often reached under sunlight, the adhesive tape can be removed without residue from the surface to be protected.

In order to improve the unwind force of product in roll form, it is advantageous to use a release coating. Preference is given to using silicones and polyvinyl carbamates, especially polyvinyl stearylcarbamate (PVSC), applied at a rate of from 0.2 to 0.5 g/m$^2$.

Surprisingly, an adhesive composed essentially of a copolymer or terpolymer having a Mooney viscosity ML (1+4) 125° C. of at least 50 exhibits the desired combination of properties:

good initial adhesion low peel increase good UV stability extremely little, if any, paint deformation sufficient bond strength when applied to curved surfaces high cohesion (no residues after storage, not even at increased removal temperatures of 50° C.)

The combination of good initial adhesion and low peel increase after storage, in particular, are completely surprising properties.

These self-adhesive compositions possess, on the one hand, good adhesion to the wide variety of paints which are customary in the automobile industry. Even under the influence of moisture or alternating climatic conditions (AFERA 4001), wind, or in complex bonding geometries on edges and curved surfaces, the protective film does not detach from the vehicle. Moreover, the self-adhesive composition possesses a sufficient bond strength within the first few minutes after application, so that after just half an hour, for example, the protective sheet may be subjected to severe slipstream load (up to 160 km/h), but on the other hand may also be removed with ease following prolonged use. In particular, no paint deformation even following storage under alternating climatic conditions is exhibited by the self-adhesive composition of the invention on a 65 μm film, composed predominantly of a propylene copolymer, on polyurethane-painted metal panels which have been treated by heating at 130° C. for 30 minutes.

The peel force of the protective sheet of the invention from PU paints is at least 0.2 immediately following application and not more than 3.0 N/cm following storage under alternating climatic conditions (in analogy to AFERA method 4001).

The peel force at a realistic removal speed of 20 m/min is 3.6 N/cm or less. Even exposure of the protective sheet to UV light, using for example a Xenotest 1200 at 55° C. for 3000 hours (DIN 53387), does not cause any deficiencies in the properties of the sheet, such as embrittlement. The protective sheet causes neither instances of paint deformation or paint discoloration, nor do residues of adhesive occur on removal.

The protective sheet of the invention is therefore particularly suitable for protecting the fresh finish of automobiles during assembly or transit, or as processing and transit protection for freshly painted steel panels. The protective sheet can be bonded just half an hour after the painted surfaces have passed through the oven, without any disadvantages whatsoever, despite the fact that at this time the paint has not yet fully cured.

A further feature of the protective sheet of the invention is that it can be applied in great width over the hood, roof and trunk of automobiles and that, owing to its deformability, it conforms very well to planar and even gently curved shaped areas. It is therefore possible to protect the horizontal areas which are most at risk from soiling. However, even narrow areas such as, for example, the projection of the door below the windows, or bumpers, can easily be covered. Protection of the vertical areas on the vehicle is particularly appropriate during its assembly.

The protection sheet is resistant to sunlight, moisture, heat, and cold, with weathering stability of at least six months. Even very high sun levels, such as are encountered in Florida, for example, do not cause the protective sheet to fail or detach, at least not within a period of six months.

Following application of the protective sheet and storage for 14 days under fluctuating temperatures, even under the effect of weathering, the self-adhesive composition does not give rise to any deformation of the underlying paint film. Furthermore, the strength of the protective sheet in comparison to preservation with wax ensures impeccable protection against soiling such as bird droppings and against damage to the vehicle as a whole by minor mechanical events.

Despite the requisite effective adhesion, the protective sheet can be removed after use without residue and without tearing of the backing film. The protective sheet here benefits from its low peel increase on the paint surface, so that even after being bonded in great widths it can be removed with a low degree of force.

In the text below, the test methods used are described in more detail.

The bond strengths are determined at a removal angle of 180° in accordance with AFERA 4001. This is done using steel plates and also metal test panels finished with a PU paint as the test substrate. In a modified bond strength test, the 15 mm wide test strips are removed from a PU-painted metal panel at a speed of 20 m/min and an angle of 180°, at a temperature of 23° C.±1° C. and a relative atmospheric humidity of 50%±5%.

The maximum removal temperatures are determined at removal angles of 90 and 180°, with the test temperatures being increased in steps (5° C.). A note is made of the temperature at which there are no residues of adhesive or transfer to the test substrates. The test substrates used are metal panels finished with a PU paint.

The bond strengths, maximum removal temperature, and paint deformations were determined following storage under alternating climatic conditions. The test substrate used was again sheet metal finished with PU paint.

Storage under alternating climatic conditions comprises the following cycles:

| Cycle 1 | | Cycle 2 | |
| --- | --- | --- | --- |
| Duration [h] | Temperature [° C.] | Duration [d] | Temperature [° C.] |
| 3 | 90 | 4 | 80 |
| | | 4 | −30 |
| | | 16 | 40 at 98% rel. humidity |

For storage under alternating climatic conditions, cycle 1 is run once and cycle 2 four times, and then this procedure is repeated once more.

After the test strips have been removed, the paint deformation is assessed visually.

In the text below, the invention will be illustrated by reference to examples, which are not, however, intended to be restrictive.

EXAMPLES

Example 1

A film is manufactured by flat film extrusion in a width of 1 450 mm. It is composed of a 50 µm thick base layer and a 15 µm thick adhesion promoter layer. The base layer is composed of 60 parts by weight of a PP copolymer, 25 parts by weight of a PP homo-polymer, 6.3 parts by weight of LLDPE, 8.4 parts by weight of titanium dioxide and 0.3 part by weight of a HALS stabilizer (Tinuvin 770, Ciba) (in analogy to example 3 of DE 199 23 780 A1). The adhesion promoter layer (10 µm) is composed of a mixture of 40 parts by weight of the PP copolymer, 10 parts by weight of LLDPE and 50% by weight of the base polymer as described for the adhesive. The back of the backing film is coated with a release coating composed of PVSC (polyvinyl stearylcarbamate) from a solution in toluene, in a thickness of 0.3 g/m².

As the adhesive, a 10% strength solution in toluene composed of 70% by weight of a terpolymer composed of ethylene, propylene and 5-ethylidene-2-norbornene, having a Mooney viscosity ML. (1+4) 125° C. of 75, and 30% by weight of Foral® 105 E (Hercules) is applied to the film using a coating bar and is dried in a drying tunnel at 80° C. for four minutes. The resulting protective sheet is edged and wound up into rolls 1 400 mm wide and 200 m long. The thickness of adhesive applied is 18 µm.

The self-adhesive sheet can be unwound easily and without creases, and can be applied flawlessly when used for protecting automobiles. After use, the self-adhesive sheet can be removed again easily after a bonding period of up to six months under outdoor weathering without residues, even at relatively high speeds. No paint surface deformations are observed.

Example 2

A sheet was produced and coated as in example 1 using a terpolymer adhesive as in example 1 but with the addition of 10% by weight of Hyvis® 200 (plasticizer, BP Chemical) and 0.2% by weight of Irganox® 1010 (Ciba). The thickness of adhesive applied is 16 µm. Following storage under alternating climatic conditions on a 2K PU paint surface, this protective sheet can also be removed easily at realistic speeds. Neither residues nor paint deformations over the surface and in the edge regions are visible.

Example 3

The protective sheet was produced by coextruding three layers, including adhesive. The base layer is composed of the raw materials described in example 1. The pressure sensitive adhesive is composed of 60% by weight of a polymer of 63% by weight ethylene, 35% by weight propylene and 2% by weight 5-ethylidene-2-norbomene (granulated and powdered with amorphous silica) having a Mooney viscosity ML (1+4) 125° C. of 59, 10% by weight of a polymer composed of 51% by weight ethylene and 49% by weight propylene (granulated and powdered with amorphous silica) having a Mooney viscosity ML (1+4)125° C. of 50, 30% by weight of Regalite® R101 (Hercules) and 0.2% by weight of Irganox 1010 (Ciba).

The extruder for the base layer was charged with the raw materials specified in example 1, that of the adhesive layer with the granulated powdered terpolymer, and the extruder for the intermediate adhesion promoter layer with a mixture of 50 parts by weight of recycled protective sheet from example 1 and 50 parts by weight of granulated base polymer of the pressure sensitive adhesive from this example.

Following storage under alternating climatic conditions on a PU paint surface, this protective sheet can also be removed easily at realistic speeds. Neither residues nor paint deformations over the surface and in the edge regions are visible.

Example 4

The protective sheet was produced as in example 1 but with the following alterations: the adhesive was composed of 60% by weight of a terpolymer (52% by weight ethylene, 39% by weight propylene and 9% by weight 5-ethylidene-2-norbornene, with a Mooney viscosity ML (1+4) 125° C. of 60), 10% by weight of a terpolymer (69% by weight ethylene, 27% by weight propylene and 4% by weight 5-ethylidene-2-norbornene, with a Mooney viscosity ML (1+4) 125° C. of 23), 20% by weight of a liquid polybutene (Hyvis® 200, BP Chemicals) and a tackifier resin (Hercures® A 101, Hercules). Following application to the backing film, the adhesive was crosslinked in a heating tunnel at 110° C.

The protective sheet was applied to freshly painted metal panels (PU paint). Following storage under alternating climatic conditions, this protective sheet can be removed easily even at realistic speeds. No residues are visible over the area and in the edge regions, although there are slight paint deformations.

| Example No. | 1 | 2 | 3 | 4 |
|---|---|---|---|---|
| Bond strength to steel (AFERA 4001) [N/cm] | 0.5 | 1.0 | 0.5 | 0.3 |
| Bond strength to PU paint after 0.5 h [N/cm] | 0.3 | 0.8 | 0.4 | 0.2 |
| Bond strength to PU paint following storage under alternating climatic conditions; removal speed 0.3 m/min [N/cm] | 1.6 | 2.4 | 1.8 | 2.9 |
| Bond strength to PU paint following storage under alternating climatic conditions; removal speed 20 m/min [N/cm] | 2.8 | 3.0 | 1.9 | 2.6 |
| Max. removal temperature from PU paint following storage under alternating climatic conditions [° C.] | 60 | 50 | 55 | 50 |
| Residues | – | – | – | – |
| Deformations | – | – | – | + |

– none; + few; ++ moderate; +++ severe

Comparative Example 1

Production is as in example 1. The pressure sensitive adhesive used is a copolymer composed of 48% by weight each of propylene and ethylene and 4% by weight of 5-ethylidene-2-norbornene, having a Mooney viscosity ML (1+4) at 125° C. of 28. The solvent used was toluene. Following storage under alternating climatic conditions bonded to PU paint and subsequent removal at a realistic speed, residues of adhesive are observed.

Comparative Example 2

The adhesive used is a blend of 30% by weight of a terpolymer (56% by weight ethylene, 38.8% by weight propylene and 5.2% by weight dicyclopentadiene; Mooney viscosity ML (1+4) 125° C. of 43), 55% by weight of a terpolymer (51% by weight ethylene, 44% by weight propylene and 5% by weight 5-ethylidene-2-norbornene, Mooney viscosity ML (1+4) 125° C. of 20), 5% by weight of a terpene resin (Resin PC 1150, Yasuhara Chemical), and 15% by weight of a liquid polybutene (Hyvise® 5, BP Chemicals) and 2.5% by weight of triallyl cyanurate. The adhesive was prepared as in comparative example 1 and following application to the polyolefin film (example 1) was crosslinked using electron beams under nitrogen (dose: 10 kGy). Following storage under alternating climatic conditions, severe paint surface deformations are observed.

Comparative Example 3

The adhesive used is a copolymer composed of 30 mol % each of propylene and 1-butene and 40 mol % of 4-methyl-1-pentene. The adhesive is prepared as described in comparative example 1. Following unmasking after storage under alternating climatic conditions, a sharp increase in the bond strengths, and also residues on the paint surface, are observed.

Comparative Example 4

As for comparative example 1, but with a copolymer composed of 70 mol % vinyl acetate and 30 mol % ethylene (Levapren® 700, Bayer). Following bonding to fresh paint, severe paint surface deformations are visible. The removal of the sheet from PU paint after storage under alternating climatic conditions, at a speed of 20 m/min, is possible only with a large amount of force.

Comparative Example 5

Production is as in example 1 using as adhesive a mixture of polyisobutylenes, 25 parts by weight of Oppanol® 150 (BASF) and 75 parts by weight of Textrax® 4T (Nippon Petrochemicals). Samples bonded to PU paint are subjected to storage under alternating climatic conditions. The removal forces are very low. On bonding to fresh paint, slight paint deformations are evident in the edge region.

| Comparative example No. | 1 | 2 | 3 | 4 | 5 |
|---|---|---|---|---|---|
| Bond strength to steel (AFERA 4001) [N/cm] | 0.6 | 0.3 | 0.3 | 0.9 | 0.2 |
| Bond strength to PU paint after 0.5 h [N/cm] | 0.4 | 0.2 | 0.3 | 0.7 | 0.1 |
| Bond strength to PU paint following storage under alternating climatic conditions; removal speed 0.3 m/min [N/cm] | 2.3 | 2.2 | 2.5 | 3.4 | 2.0 |
| Bond strength to PU paint following storage under alternating climatic conditions; removal speed 20 m/min [N/cm] | 4.3 | 3.4 | 3.2 | 5.1 | 0.7 |
| Max. removal temperature from PU paint following storage under alternating climatic conditions [° C.] | <25 | 60 | <25 | 50 | 70 |
| Residues | ++ | − | ++ | − | − |
| Deformations | − | ++ | − | +++ | + |

− none; + few; ++ moderate; +++ severe

What is claimed is:

1. A self-adhesive protective sheet for painted surfaces of vehicles, comprising a film which is coated on one side with an adhesive, the adhesive coated side of which adheres to steel with a bond strength of between 0.1 and 2.0 N/cm, and which self-adhesive protective sheet following storage, under alternating climatic conditions at a temperature of at least 50° C., is removable without residue from painted surfaces to which the adhesive coated side is bonded, at speeds of 20 m/min with a bond strength of the adhesive coated side to said painted surfaces of from 2.3 to 3.6 N/cm, is detachable at a temperature of up to at least 50° C., said adhesive comprising at least one copolymer of at least two different α-olefins, no monomer of said copolymer having a fraction of 75 mol % or more in the copolymer, the copolymer having a Mooney viscosity ML (1+4) 125° C. of at least 50, and the copolymer optionally including a diene as a comonomer.

2. The self-adhesive protective sheet as claimed in claim 1, having a UV transmittance in the region from 290 to 360 nm below 1%.

3. The self-adhesive protective sheet as claimed in claim 1, wherein the bond strength of the adhesion to steel is between 0.3 and 1.0 N/cm.

4. The self-adhesive protective sheet as claimed in claim 1, wherein the adhesive comprises at least one copolymer of ethylene and propylene.

5. The self-adhesive protective sheet as claimed in claim 1, wherein said at least one copolymer is formed of between 40 and 60 mol % olefinic monomers.

6. The self-adhesive protective sheet as claimed in claim 1, wherein said at least one copolymer of at least two different α-olefins has a Mooney viscosity ML (1+4) 125° C. of between 55 and 85.

7. The self-adhesive protective sheet as claimed in claim 1, wherein at least one polymer of the adhesive is composed of ethylene, propylene and a diene.

8. The self-adhesive protective sheet as claimed in claim 1, wherein a diene is included in said copolymer, in an amount of less than 10% by weight of the copolymer.

9. The self-adhesive protective sheet as claimed in claim 1, wherein the adhesive contains up to 50% by weight of one or more tackifier resins, up to 40% by weight of one or more plasticizers or both said tackifier resins and said plasticizers.

10. The self-adhesive protective sheet as claimed in claim 1, wherein an adhesion promoter layer is located between the backing film and the adhesive.

11. The self-adhesive protective sheet as claimed in claim 1, wherein the adhesive is crosslinked.

12. The self-adhesive protective sheet as claimed in claim 1, wherein there is a release coating on the side of the backing film which is opposite the adhesive-coated side.

13. The self-adhesive protective sheet as claimed in claim 1, wherein the adhesive and the backing film are joined by coextrusion.

14. A method for protecting curved surfaces on the outside of automobiles, which comprises covering said curved surfaces with the self-adhesive protective sheet of claim 1.

15. A method for protecting painted areas of automobiles prior to assembly which comprises covering said painted areas with the protective sheet of claim 1 prior to assembly of the automobiles.

* * * * *

UNITED STATES PATENT AND TRADEMARK OFFICE
CERTIFICATE OF CORRECTION

PATENT NO.       : 6,811,869 B2                                        Page 1 of 1
APPLICATION NO.  : 10/076827
DATED            : November 2, 2004
INVENTOR(S)      : Luhmann et al.

It is certified that error appears in the above-identified patent and that said Letters Patent is hereby corrected as shown below:

Column 11, Line 22, "ML. (1+4)" should read -- ML (1+4) --

Column 11, Line 54, "5-ethylidene-2-norbomene" should read
-- 5-ethylidene-2-norbornene --

Column 13, Line 5, "(Hyvise® 5," should read -- "(Hyvis® 5, --

Signed and Sealed this

Twenty-seventh Day of March, 2007

JON W. DUDAS
*Director of the United States Patent and Trademark Office*